United States Patent
Suzuki (10) Patent No.: US 9,942,738 B2
(45) Date of Patent: Apr. 10, 2018

(54) DATA DELIVERY CONTROL SYSTEM, DATA DELIVERY CONTROL METHOD, AND STORAGE MEDIUM STORING DATA DELIVERY CONTROL PROGRAM

(71) Applicant: NEC Corporation, Minato-ku, Tokyo (JP)

(72) Inventor: Yuusuke Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 135 days.

(21) Appl. No.: 14/625,969

(22) Filed: Feb. 19, 2015

(65) Prior Publication Data
US 2015/0244831 A1 Aug. 27, 2015

(30) Foreign Application Priority Data
Feb. 24, 2014 (JP) .................................. 2014-032572

(51) Int. Cl.
| | | |
|---|---|---|
| *H04L 29/06* | (2006.01) | |
| *H04L 29/08* | (2006.01) | |
| *H04W 4/22* | (2009.01) | |
| *H04W 4/06* | (2009.01) | |

(52) U.S. Cl.
CPC ............. *H04W 4/22* (2013.01); *H04W 4/06* (2013.01)

(58) Field of Classification Search
CPC .......... H04L 67/32; H04L 67/42; H04L 67/10
USPC ......................... 709/219, 220, 223, 224, 226
See application file for complete search history.

(56) References Cited

U.S. PATENT DOCUMENTS

| 9,729,500 B2 * | 8/2017 | Szamonek .......... H04L 61/2007 |
| 2010/0085907 A1 | 4/2010 | Yasumoto |
| 2013/0117365 A1 * | 5/2013 | Padmanabhan ....... H04W 4/206 709/204 |

(Continued)

FOREIGN PATENT DOCUMENTS

| JP | 2006-254467 A | 9/2006 |
| JP | 2007274243 A | 10/2007 |
| JP | 2008-122503 A | 5/2008 |

(Continued)

OTHER PUBLICATIONS

"Determining the Geographic Location of Internet Hosts"—Padmanabhan et al, University of California Berkeley, Computer Science Division, Nov. 2002 http://sahara.cs.berkeley.edu/papers/PS01a.pdf.*

(Continued)

*Primary Examiner* — Randy Scott (57) ABSTRACT

Disclosed is a data delivery control system capable of allowing for data delivery to a large number of client terminal devices without imposing a heavy load on the network by flexibly dealing with the network configuration. The data delivery control system includes at least one second client terminal device among a plurality of client terminal devices and a data delivery control device. The second client terminal device includes a terminal detection unit that detects at least one logically proximate first client terminal device to which delivery data received from a server device can be transferred, and a terminal-to-terminal data transfer unit that transfers the delivery data to the at least one first client terminal device. The data delivery control device includes a data delivery unit that delivers the delivery data to the at least one second client terminal device.

10 Claims, 10 Drawing Sheets

(56) References Cited

U.S. PATENT DOCUMENTS

2016/0337795 A1* 11/2016 Nachman .............. H04W 4/023

FOREIGN PATENT DOCUMENTS

| JP | 2009-267622 A | 11/2009 |
|----|---------------|---------|
| JP | 2010-093386 A | 4/2010 |
| JP | 2011-130277 A | 6/2011 |
| JP | 4696972 B2 | 6/2011 |

OTHER PUBLICATIONS

Japanese Office Action for JP Application No. 2014-032572 dated Nov. 14, 2017 with English Translation.

* cited by examiner

| IP ADDRESS OF PROXIMATE TERMINAL | COMMUNICATION MEANS | LAST ACCESS TIME | STATE | PRIORITY | SPECIFIED DELIVERY |
|---|---|---|---|---|---|
| IP ADDRESS 2 | Wi-Fi | 2013/10/29 10:32:05 | NOT IDLE | 4 | UNICAST |
| IP ADDRESS 3 | Intranet | 2013/10/11 15:40:23 | IDLE | 6 | |

120-1 TERMINAL INFORMATION

Fig. 5

| REPRESENTATIVE DELIVERY TERMINAL | | | | PROXIMATE TERMINAL | | | | |
|---|---|---|---|---|---|---|---|---|
| IP ADDRESS | LAST ACCESS TIME | STATE | PRIORITY | IP ADDRESS | COMMUNICATION MEANS | STATE | PRIORITY | SPECIFIED DELIVERY |
| IP ADDRESS 1 | 2013/10/28 80:00:00 | NOT IDLE | 2 | IP ADDRESS 2 | Wi-Fi | NOT IDLE | 4 | UNICAST |
| | | | | IP ADDRESS 3 | Intranet | IDLE | 6 | |
| IP ADDRESS 4 | 2013/10/10 14:54:02 | IDLE | 3 | IP ADDRESS 5 | bluetooth | NOT IDLE | 5 | UNICAST |
| IP ADDRESS 6 | 2013/10/28 8:13:43 | NOT IDLE | 1 | — | — | — | — | — |
| ⟩ 221 | ⟩ 222 | ⟩ 223 | ⟩ 224 | ⟩ 225 | ⟩ 226 | ⟩ 227 | ⟩ 228 | ⟩ 229 |

220 TERMINAL INFORMATION

DATA DELIVERY CONTROL SYSTEM, DATA DELIVERY CONTROL METHOD, AND STORAGE MEDIUM STORING DATA DELIVERY CONTROL PROGRAM

This application is based upon and claims the benefit of priority from Japanese Patent Application No. 2014-032572, filed on Feb. 24, 2014, the disclosure of which is incorporated herein in its entirety by reference.

TECHNICAL FIELD

The present invention relates to a data delivery control system and the like that control processes of delivering delivery data from a server device to a plurality of client terminal devices.

BACKGROUND ART

Recently, there has been an increased opportunities to do push-type data deliveries like Earthquake Early Warnings, where data is delivered from a server device to a lot of client terminal devices in an emergency. During the delivery, a higher load is imposed on resources of the server device, such as processors, and on a communication network (hereinafter simply called a network) around the server device as data is to be delivered to a larger number of client terminal devices. This higher load may cause a delay in data delivery. If such delay occurs in an emergency, human lives may be involved. Accordingly, an improved infrastructure is needed to ensure that data is delivered without delay even when it is delivered to a large number of client terminal devices. However, such infrastructure improvement is not easy due to cost and other issues. Thus, there is a growing expectation for a technology that allows for data deliveries to a large number of client terminal devices without imposing a heavy load on the server device and network.

As a technique related to such technology, Patent Literature 1 (Japanese Unexamined Patent Application Publication No. 2007-274243) discloses a broadcast-type content delivery system using a plurality of channels. This system uses wireless communication to receive content data during a period from the channel switching performed by a user to the connection via wire communication established between a content data delivery device and a terminal device.

Patent Literature 2 (Japanese Registered Patent Publication No. 4696972) discloses a technology involving a plurality of terminal devices that are connected via a hierarchical network. This technology allows delivered content data to be transferred from an upstream terminal device to a downstream terminal device.

SUMMARY

As seen in the technology disclosed in Patent Literature 2, transferring delivery data from some terminal devices to other terminal devices can reduce the load imposed on resources of the server device and on a network area logically in the vicinity of the server device. This technology, however, poses a possibility of imposing a heavy load on the network due to, for example, a data transfer between terminal devices not being logically close to each other.

In general, a variety of configurations are available for a network to which a large number of client terminal devices are connected. In addition, a network configuration varies with time through addition or deletion of a client terminal device. Accordingly, it is an issue to flexibly deal with a network configuration during a data transfer between terminal devices so as to reduce a load imposed on the server device delivering data to a large number of client terminal devices. This issue is not solved by the above-described techniques disclosed in Patent Literature 1 and 2.

A primary object of the present invention is to provide a data delivery control system and the like which solve the issue.

A data delivery control system according to an exemplary aspect of the present invention includes: at least one second client terminal device existing among the plurality of client terminal devices; and a data delivery control device; wherein the at least one second client terminal device includes: a terminal detection unit that detects, from among the plurality of client terminal devices available for communication via a network, and based on a predetermined criterion, at least one logically proximate first client terminal device to which delivery data received from a server device can be transferred, the terminal detection unit then storing into a terminal information storage unit terminal information which includes a list of identifiers capable of identifying the detected first client terminal devices while externally outputting the same terminal information, a terminal-to-terminal data transfer unit that transfers the delivery data to the at least one first client terminal device by referencing the terminal information upon receipt of the delivery data, and wherein the data delivery control device includes: a data delivery unit that delivers, upon receipt of the delivery data from the server device to be delivered to the at least one first and second client terminal devices, the delivery data to the at least one second client terminal device by referencing the terminal information that has been output from the terminal detection unit.

A data delivery control method according to an exemplary aspect of the present invention includes: by at least one second client terminal device among a plurality of client terminal devices, detecting, from among the plurality of client terminal devices available for communication via a network, and based on a predetermined criterion, at least one logically proximate first client terminal device to which delivery data received from a server device can be transferred, then storing into a terminal information storage unit terminal information which includes a list of identifiers capable of identifying the detected first client terminal devices while externally outputting the same terminal information, and transferring the delivery data to the at least one first client terminal device by referencing the terminal information upon receipt of the delivery data; by a data delivery control device, delivering, upon receipt of the delivery data from the server device to be delivered to the at least one first and second client terminal devices, the delivery data to the at least one second client terminal device by referencing the terminal information.

A non-transitory computer-readable medium according to an exemplary aspect of the present invention stores a computer program: causing at least one second client terminal device among a plurality of client terminal devices to realize, a terminal detection function that detects, from among the plurality of client terminal devices available for communication via a network, and based on a predetermined criterion, at least one logically proximate first client terminal device to which delivery data received from a server device can be transferred, the terminal detection function then storing into a terminal information storage unit terminal information which includes a list of identifiers capable of identifying the detected first client terminal devices while externally outputting the same terminal information, and a terminal-to-terminal data transfer function that transfers the delivery data to the at least one first client terminal device by referencing the terminal information upon receipt of the delivery data; causing a data delivery control device to realize, a data delivery function that delivers, upon receipt of the delivery data from the server device to be delivered to the at least one first and second client terminal devices, the delivery data to the at least one second client terminal device by referencing the terminal information that has been output by the terminal detection function.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail with reference to the drawings.

First Exemplary Embodiment

Figure 1:
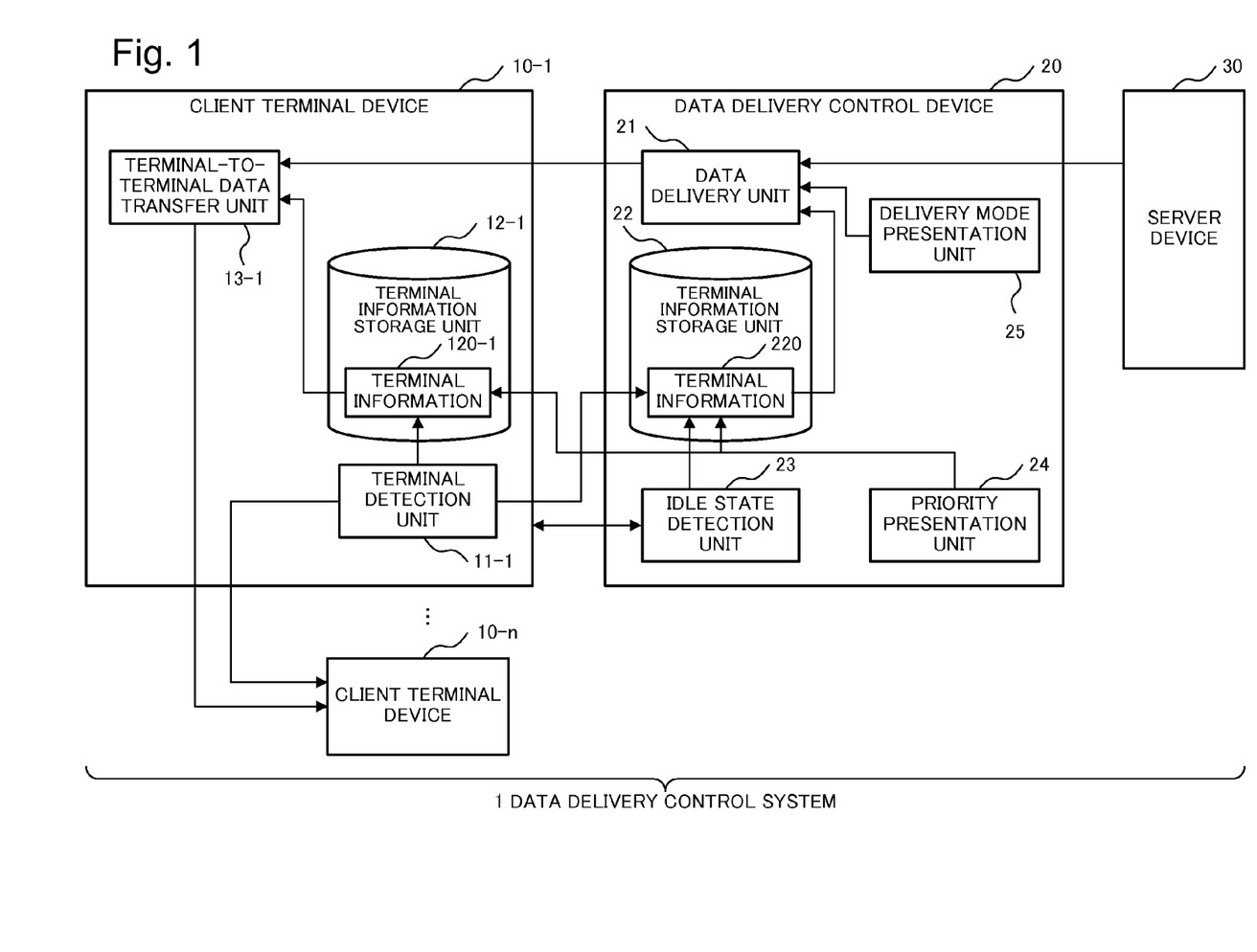
FIG. 1 is a block diagram illustrating a configuration of a data delivery control system according to a first exemplary embodiment of the present invention.

FIG. 1 is a conceptual block diagram illustrating a configuration of a data delivery control system 1 according to a first exemplary embodiment of the present invention. The data delivery control system 1 according to this exemplary embodiment includes client terminal devices 10-1 to 10-n (where n is an integer equal to or greater than 2 and represents the number of client terminal devices), a data delivery control device 20, and a server device 30.

The server device 30, which is a server device such as a content server, outputs data to be delivered to the client terminal devices 10-1 to 10-n. The data delivery control device 20 receives the delivery data from the server device 30 and controls delivery of the data to be sent to the client terminal devices 10-1 to 10-n. The data delivery control device 20 is, for example, a reverse proxy server. Optionally, the data delivery control device 20 may be built in the server device 30.

The client terminal device 10-1 includes a terminal detection unit 11-1, a terminal information storage unit 12-1, and a terminal-to-terminal data transfer unit 13-1. The client terminal devices 10-2 to 10-n are each configured similarly to the client terminal device 10-1. The terminal detection unit 11-1 and the terminal-to-terminal data transfer unit 13-1 each may be implemented by an electronic circuit or may be implemented by a computer program and a processor that operates according to the program. The terminal information storage unit 12-1 is a storage device, such as electronic memory or a magnetic disk, where accesses are controlled by an electronic circuit or by a computer program and a processor that operates according to the program.

The terminal detection unit 11-1 communicates with the client terminal devices 10-2 to 10-n and determines, based on a predetermined criterion, whether the client terminal device 10-i in communication (where i is an integer between 2 and n) is to be a proximate terminal to which data delivered from the data delivery control device 20 will be transferred. The terminal detection unit 11-1 may carry out this process periodically or on the basis of an instruction given by a system administrator who administers the data delivery control system 1.

An example of the predetermined criterion may be whether the client terminal units 10-1 and 10-i are logically proximate to each other on a network. For example, if the difference between values representing the IP (Internet Protocol) addresses of the client terminal devices 10-1 and 10-i is equal to or less than a threshold value, the client terminal device 10-1 may detect the client terminal device 10-i as its proximate terminal. This is because, in general, IP address values close to each other are often assigned to client terminal devices that are logically proximate to each other on a network.

Alternatively, after the terminal detection unit 11-1 measures a data transfer speed during communication with the client terminal device 10-i, the client terminal device 10-1 may detect the client terminal device 10-i as its proximate terminal if the data transfer speed is equal to or greater than a threshold value. This is because, in general, a data transfer speed is relatively higher between client terminal devices that are logically proximate to each other on a network. In this case, the threshold value for a data transfer speed may vary depending on whether the client terminal device 10-i is connected to a network via Wi-Fi (Wireless Fidelity) or an intranet as a communication means.

The terminal detection unit 11-1 transmits to the data delivery control device 20 a transmitted message of terminal information 110-1 which contains information on the client terminal device 10-i that has been detected as the proximate terminal.

Figure 3:
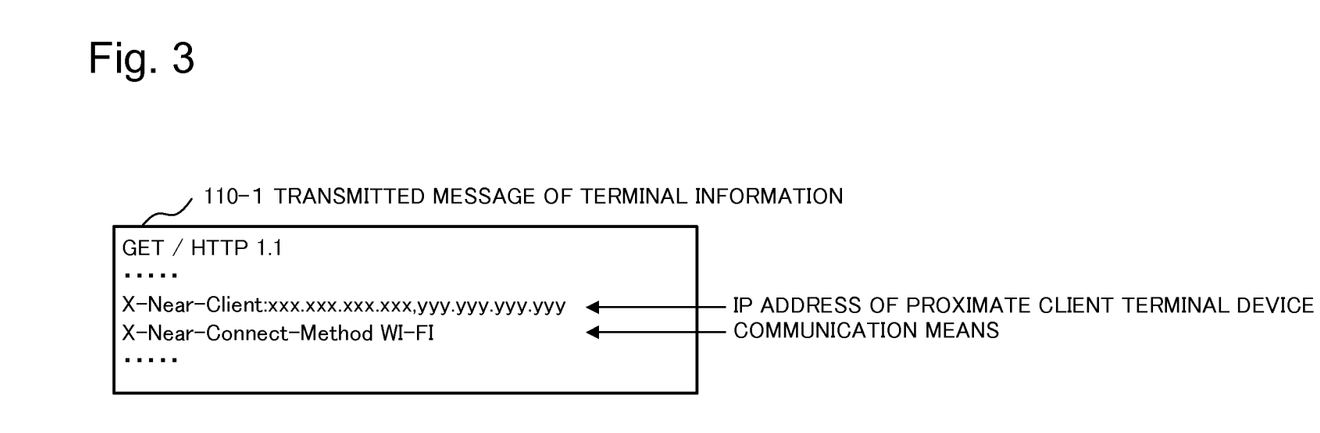
FIG. 3 represents an example of a transmitted message of terminal information according to the first exemplary embodiment of the present invention.

FIG. 3 represents an example of the transmitted message of terminal information 110-1. The example in FIG. 3 shows that the transmitted message of terminal information 110-1 contains an IP address of the client terminal device 10-i that has been detected as the proximate terminal as well as information about the communication means for the client terminal device 10-i to connect to the network.

The terminal detection unit 11-1 also stores terminal information 120-1, i.e., information about the client terminal device 10-$i$ which has been detected as the proximate terminal, into the terminal information storage unit 12-1.

Figure 4:
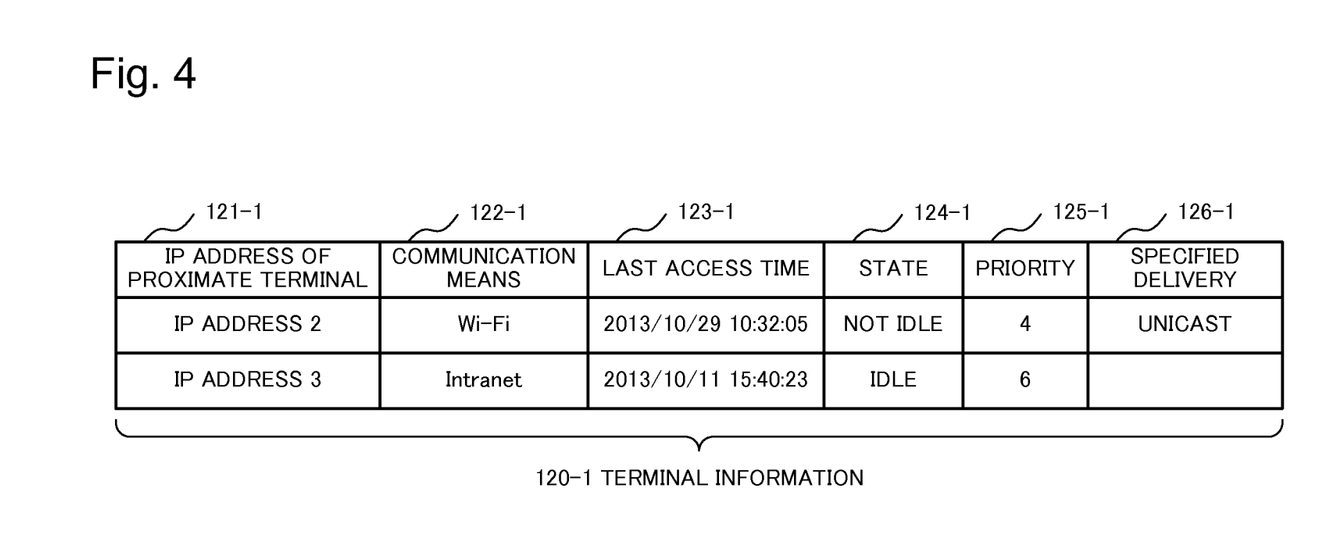
FIG. 4 represents an example of the structure of terminal information stored in a client terminal device according to the first exemplary embodiment of the present invention.

FIG. 4 represents an example of the structure of the terminal information 120-1. The terminal information 120-1 includes a record associated with the following items: a proximate terminal IP address 121-1, a communication means 122-1, a last access time 123-1, a state 124-1, a priority 125-1, and a specified delivery 126-1.

The example in FIG. 4 shows that the terminal detection unit 11-1 has detected two client terminal devices as the proximate terminals. The proximate terminal IP address 121-1 represents a value of the IP address of the client terminal device 10-$i$. In this example, it is assumed that the addresses of the client terminal devices 10-2 and 10-3 are IP addresses 2 and 3, respectively. That is, the example in FIG. 4 shows that the terminal detection unit 11-1 has detected the client terminal devices 10-2 and 10-3 as the proximate terminals for the client terminal device 10-1. The communication means 122-1 represents the information indicating the communication means used for the respective client terminal devices 10-2 and 10-3 to connect to the network.

The last access time 123-1 represents the information indicating the times the client terminal devices 10-2 and 10-3 each last accessed the server device 30. The information for the last access time 123-1 is extracted by the terminal detection unit 11-1 from log information stored in the client terminal devices 10-2 and 10-3. The state 124-1 represents the information indicating whether the client terminal devices 10-2 and 10-3 are each in an idle state or not. In this exemplary embodiment, the terminal detection unit 11-1 determines that the client terminal devices 10-2 and 10-3 are each in the idle state if each of the devices has not accessed the server device 30 for at least a predetermined period. The example in FIG. 4 shows that the client terminal device 10-3 has not accessed the server device 30 for a long time. Thus, the terminal detection unit 11-1 determines the client terminal device 10-3 to be in the idle state. It should be noted that the above-described way of determining to be idle is only an example. For example, the terminal detection unit 11-1 may make the determination concerning the idle state by using a piece of information, such as operation results of an application, which information is contained in the log information stored in the client terminal devices 10-2 and 10-3.

The priority 125-1 represents the information indicating priorities to be applied when the data delivery control device 20 sequentially delivers delivery data to the client terminal devices 10-1 to 10-$n$ not by multicast but by unicast. The information for the priority 125-1 is input from the data delivery control device 20.

The specified delivery 126-1 represents the information indicating, in the case of unicast delivery, that the data delivery control device 20 should deliver data directly to the client terminal device 10-2 or 10-3 bypassing the client terminal device 10-1. The example in FIG. 4 specifies that, concerning the client terminal device 10-2, a direct delivery of data should be made without going through the client terminal device 10-1 in the case of unicast delivery. Values of the specified delivery 126-1 are given, for example, by a system administrator who administers the data delivery control system 1.

The terminal-to-terminal data transfer unit 13-1 receives delivery data from the data delivery control device 20. Such delivery data contains a piece of information that specifies whether to deliver data by multicast or unicast. After receiving the delivery data, the terminal-to-terminal data transfer unit 13-1 references the terminal information 120-1 stored in the terminal information storage unit 12-1.

The following description assumes that the terminal information 120-1 is formed as in the example shown in FIG. 4. If the delivery data is to be delivered by multicast, the terminal-to-terminal data transfer unit 13-1 transfers the delivery data to the client terminal devices 10-2 and 10-3. For this data transfer, the terminal-to-terminal data transfer unit 13-1 gives priority to a client terminal device whose value of the state 124-1 represents being non-idle. In the example shown in FIG. 4, the terminal-to-terminal data transfer unit 13-1 first transfers the delivery data to the client terminal device 10-2, which is in a non-idle state, and then to the client terminal device 10-3, which is in the idle state.

If the delivery data is to be delivered by unicast, the terminal-to-terminal data transfer unit 13-1 transfers the delivery data to a client terminal device whose value of the specified delivery 126-1 is not set to unicast. For this data transfer, the terminal-to-terminal data transfer unit 13-1 gives priority to a client terminal device whose value of the state 124-1 represents being non-idle, and additionally follows the priorities listed in the priority 125-1 to sequentially transfer the delivery data in the order of priority from highest to lowest. In the example shown in FIG. 4, the terminal-to-terminal data transfer unit 13-1 transfers the delivery data to the client terminal device 10-3 only, whose value of the specified delivery 126-1 is not set to unicast.

The data delivery control device 20 includes a data delivery unit 21, a terminal information storage unit 22, the idle state detection unit 23, a priority presentation unit 24, and a delivery mode presentation unit 25. The data delivery unit 21, the idle state detection unit 23, the priority presentation unit 24, and the delivery mode presentation unit 25 each may be implemented by an electronic circuit or may be implemented by a computer program and a processor that operates according to the program. The terminal information storage unit 22 is a storage device, such as electronic memory or a magnetic disk, where accesses are controlled by an electronic circuit or by a computer program and a processor that operates according to the program.

The idle state detection unit 23 detects whether the client terminal devices 10-1 to 10-$n$ are each in the idle state or not, and makes the detection results reflected in the terminal information 220 stored in the terminal information storage unit 22. Similarly to the above-described terminal detection unit 11-1, the idle state detection unit 23 detects the idle state based on last access times to the server device 30, the last access times being extracted from the log information stored in the client terminal devices 10-1 to 10-$n$. That is, the idle state detection unit 23 determines that each of the client terminal devices 10-1 to 10-$n$ is in the idle state if the device has not accessed the server device 30 for at least a predetermined period. Alternatively, the idle state detection unit 23 may make the determination concerning such idle state by using a piece of information, such as operation results of an application, which information is included in the log information stored in the client terminal devices 10-1 to 10-$n$.

The priority presentation unit 24 makes values of priorities for the client terminal devices 10-1 to 10-$n$ reflected in the terminal information 120-1 and in the terminal information 220; the priority values are used when the data delivery control device 20 delivers data to the client terminal devices 10-1 to 10-$n$ by unicast. Such priority values are input to the priority presentation unit 24 by, for example, a system administrator who administers the data delivery control system 1. Alternatively, an external device may determine such priority values based on, for example, operation results of an application for the client terminal devices 10-1 to 10-*n*, and then input the values to the priority presentation unit 24.

The delivery mode presentation unit 25 inputs to the data delivery unit 21 a delivery mode indicating whether delivery data is to be delivered by multicast or unicast. Multicast is the delivery mode where data is concurrently delivered to the client terminal devices 10-1 to 10-*n* with a higher priority given to delivery speed. To the contrary, unicast is the delivery mode where data is sequentially delivered to the client terminal devices 10-1 to 10-*n* with a higher priority given to reliable delivery. The delivery mode presentation unit 25 may determine the delivery mode based on, for example, content of the delivery data and the state of a load imposed on the data delivery control system 1. Alternatively, the system administrator or the like may specify values of the delivery mode, and the values may be directly input to the data delivery unit 21.

Upon receipt of delivery data from the server device 30, the data delivery unit 21 references the terminal information 220 stored in the terminal information storage unit 22.

Figure 5:
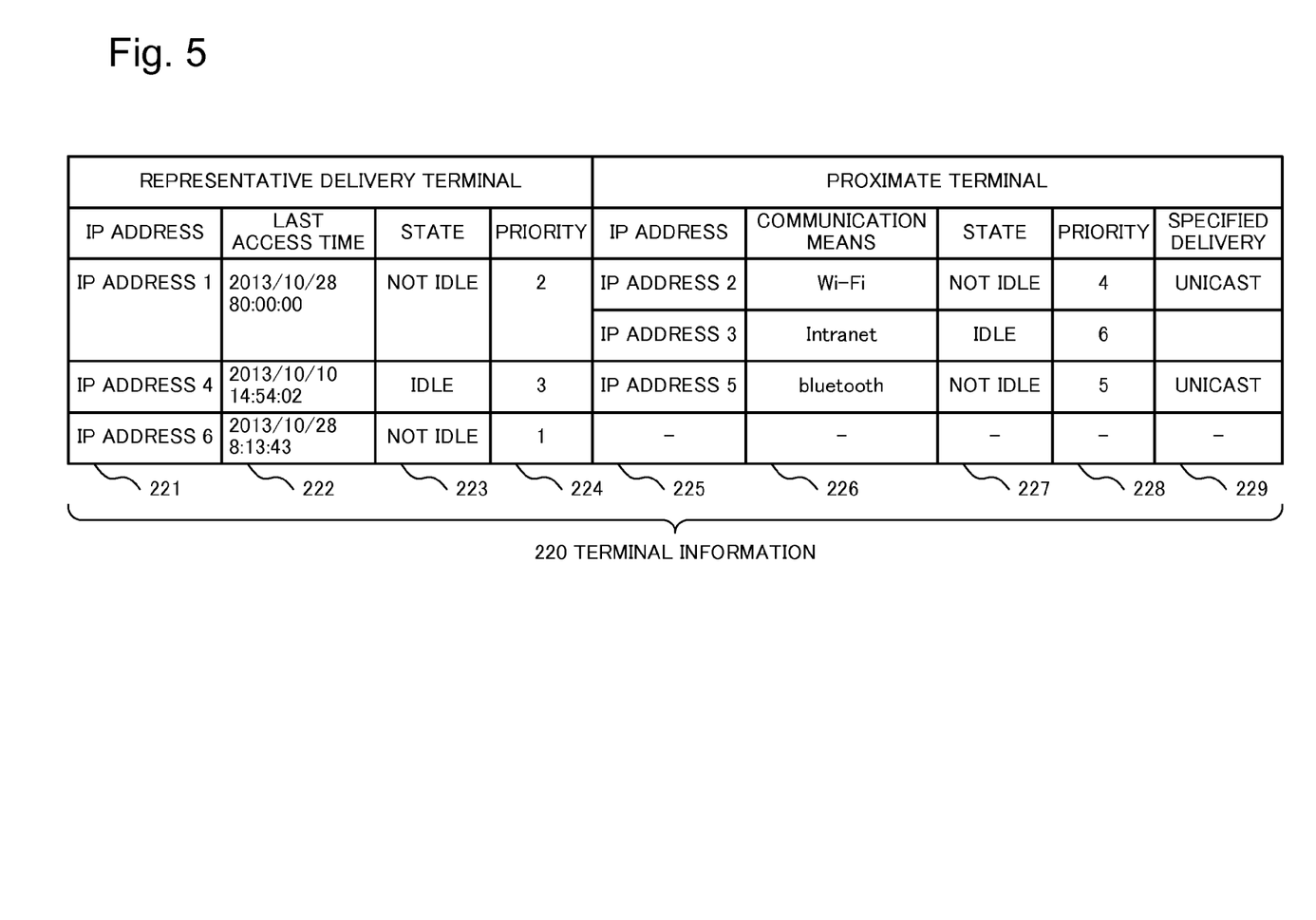
FIG. 5 represents an example of the structure of terminal information stored in a data delivery control device according to the first exemplary embodiment of the present invention.

FIG. 5 represents an example of the structure of the terminal device information 220. The terminal information 220 includes a record associated with the following items: an IP address 221, a last access time 222, a state 223, a priority 224, an IP address 225, a communication means 226, a state 227, a priority 228, and a specified delivery 229. The IP address 221, the last access time 222, the state 223, and the priority 224 each represent information about a client terminal device which acts as a representative delivery terminal.

The representative delivery terminal as used herein refers to a non-proximate client terminal device; in other words, when the data is delivered by multicast, the client terminal device (representative delivery terminal) receives delivery data directly from the data delivery control device 20. Such client terminal device transfers the delivery data delivered from the data delivery control device 20 to its proximate client terminal device(s). Note that some representative client terminal devices may not have any associated proximate client terminal device. The client terminal device having no associated proximate terminal does not transfer the delivery data.

In the example shown in FIG. 4, the client terminal device 10-1, serving as the representative delivery terminal, transfers delivery data to its proximate terminals: the client terminal devices 10-2 and 10-3. The IP address 225, the communication means 226, the state 227, the priority 228, and the specified delivery 229 each represent information about a client terminal device which acts as the proximate terminal.

In the example shown in FIG. 5, it is assumed that the IP addresses of the client terminal devices 10-1 to 10-6 are IP addresses 1 to 6, respectively. In this example, three client terminal devices 10-1, 10-4, and 10-6 are the representative delivery terminals. When delivery data is delivered by multicast, the client terminal device 10-1 transfers the delivery data to its proximate terminals, i.e., the client terminal devices 10-2 and 10-3. Likewise, the client terminal device 10-4 transfers the delivery data to its proximate terminal, i.e., the client terminal device 10-5. The client terminal device 10-6 does not transfer the delivery data as it has no associated client terminal device as its proximate terminal.

The last access time 222 and the state 223 each represent the information that has been input by the idle state detection unit 23. The priority 224 represents the information that has been input by the priority presentation unit 24. The IP address 225, the communication means 226, the state 227, the priority 228, and the specified delivery 229 each represent the information that has been input by a client terminal device which acts as the representative delivery terminal.

The following description assumes that the terminal information 220 is formed as in the example shown in FIG. 5. If delivery data is delivered by multicast, the data delivery unit 21 delivers the data to the client terminal devices 10-1, 10-4, and 10-6, all of which act as the representative delivery terminals. For this data transfer, the data delivery unit 21 gives priority to a client terminal device whose value of the state 223 represents being non-idle. In the example shown in FIG. 5, the data delivery unit 21 concurrently delivers the data to the client terminal devices 10-1 and 10-6, which are in the non-idle state, and then to the client terminal device 10-4, which is in the idle state.

When the delivery data is delivered by unicast, the data delivery unit 21 delivers the data to the client terminal devices 10-1, 10-4, and 10-6, all of which act as the representative delivery terminals. In addition, the data delivery unit 21 also delivers the data to the client terminal devices 10-2 and 10-5, which act as the proximate terminals and whose values of the specified delivery 229 are set to unicast. For this data delivery, the data delivery unit 21 gives priority to a client terminal device whose value of the state 223 or 227 represents being non-idle, and additionally follows the priorities listed in the priority 224 or 228 to sequentially transfer the delivery data in the order of priority from highest to lowest. In the example shown in FIG. 5, the data delivery unit 21 sequentially delivers the delivery data to the client terminal devices 10-6, 10-1, 10-2, 10-5, and 10-4 in the order mentioned.

Operations (processing) of the data delivery control system 1 according to this exemplary embodiment will now be described in detail with reference to the flowcharts in FIGS. 2A to 2D.

Figure 2A:
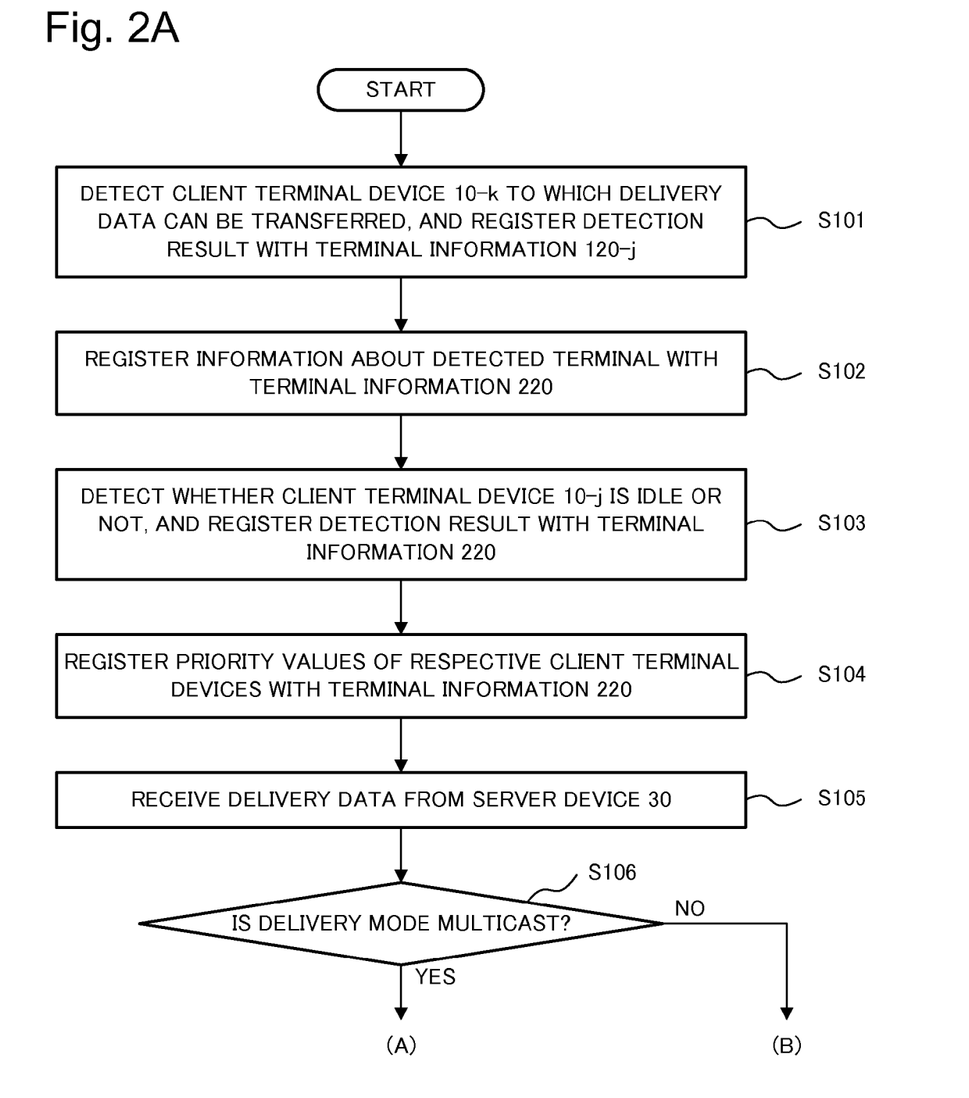
FIG. 2A is a flowchart (1/4) illustrating operations of the data delivery control system according to the first exemplary embodiment of the present invention.

The terminal detection unit 11-*j* (where j is at least one integer between 1 and n) detects any client terminal device 10-*k* (where k is at least one integer between 1 and n) to which delivery data can be transferred, and then registers the detection result with the terminal information 120-*j* (Step S101). The terminal device detection unit 11-*j* registers the information about the detected terminal device with the terminal information 220 (Step S102).

The idle state detection unit 23 detects whether the client terminal device 10-*j* is in the idle state or not, and then registers the detection result with the terminal information 220 (Step S103). The priority presentation unit 24 registers values of the priorities for the respective client terminal devices with the terminal information 220 (Step S104).

The data delivery unit 21 obtains delivery data from the server device 30 (Step S105). If the delivery mode indicated by the delivery mode presentation unit 25 is multicast (Yes in Step S106), the data delivery unit 21 references the terminal information 220. The data delivery unit 21 concurrently delivers delivery data to a client terminal device 10-*a* (where a is at least one integer between 1 and n), which acts as the representative delivery terminal and whose value of the state 223 represents being non-idle (Step S107).

Figure 2B:
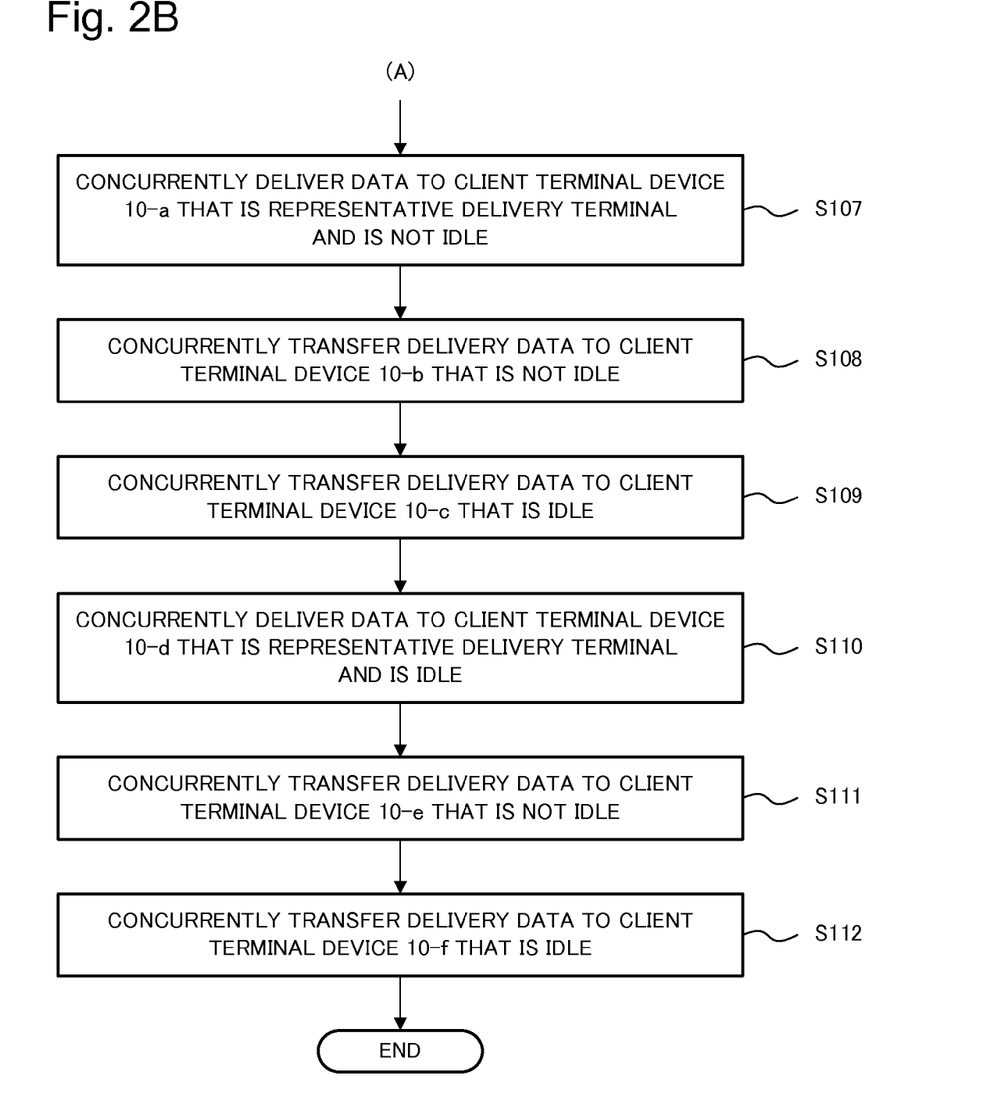
FIG. 2B is a flowchart (2/4) illustrating operations of the data delivery control system according to the first exemplary embodiment of the present invention.

The terminal-to-terminal data transfer unit 13-*a* references the terminal information 120-*a*. The terminal-to-terminal data transfer unit 13-*a* concurrently transfers the delivery data to a client terminal device 10-*b* (where b is at least one integer between 1 and n), whose value of the state 124-*a* represents being non-idle (Step S108). The terminal-to-terminal data transfer unit 13-*a* references the terminal information 120-*a*. The terminal-to-terminal data transfer unit 13-*a* concurrently transfers the delivery data to a client terminal device 10-*c* (where c is at least one integer between 1 and n), whose value of the state 124-*a* represents being idle (Step S109).

The data delivery unit 21 references the terminal information 220. The data delivery unit 21 concurrently delivers the delivery data to a client terminal device 10-*d* (where d is at least one integer between 1 and n), which acts as the representative delivery terminal and whose value of the state 223 represents being idle (Step S110). The terminal-to-terminal data transfer unit 13-*d* references the terminal information 120-*d*. The terminal-to-terminal data transfer unit 13-*d* concurrently transfers the delivery data to a client terminal device 10-*e* (where e is at least one integer between 1 and n), whose value of the state 124-*d* represents being non-idle (Step S111). The terminal-to-terminal data transfer unit 13-*d* references the terminal information 120-*d*. The terminal-to-terminal data transfer unit 13-*d* concurrently transfers the delivery data to a client terminal device 10-*f* (where f is at least one integer between 1 and n), whose value of the state 124-*d* represents being idle (Step S112), and then the whole process is finished.

Figure 2C:
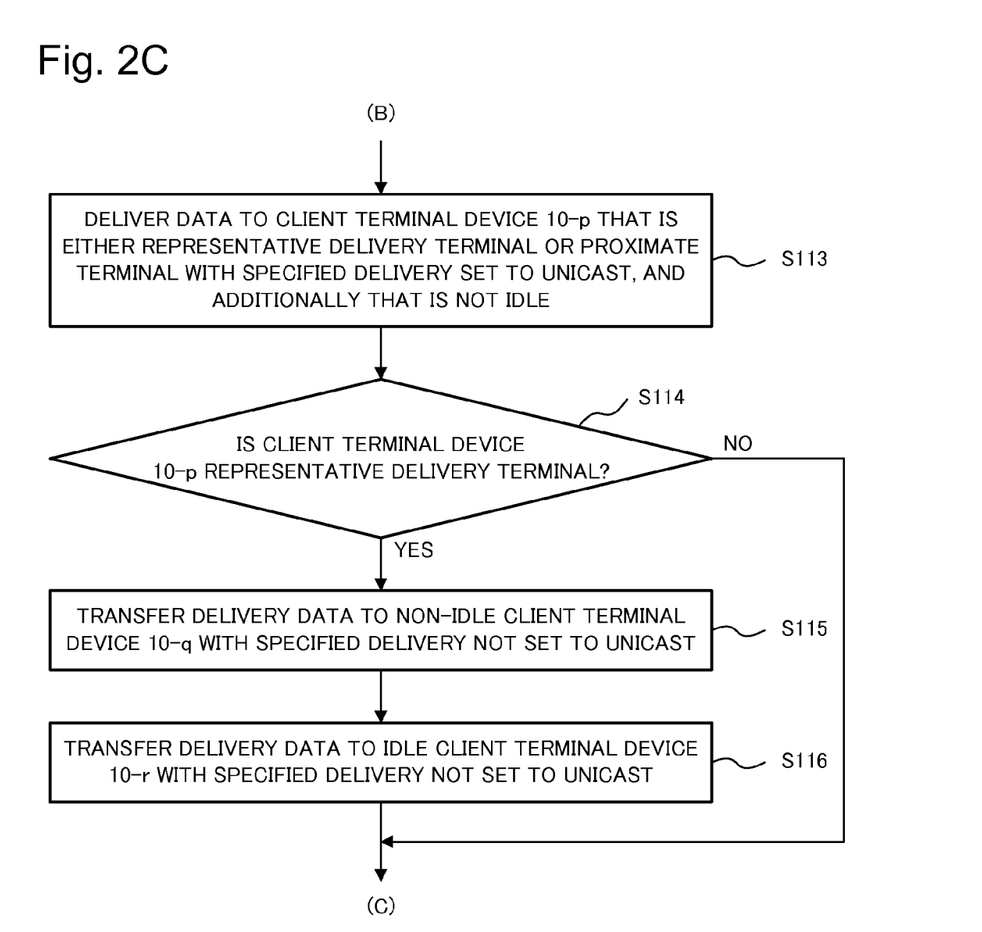
FIG. 2C is a flowchart (3/4) illustrating operations of the data delivery control system according to the first exemplary embodiment of the present invention.

If the delivery mode indicated by the delivery mode presentation unit 25 is not multicast (i.e., unicast) (No in Step S106), the data delivery unit 21 references the terminal information 220. The data delivery unit 21 sequentially delivers the delivery data to a client terminal device 10-*p* (where p is at least one integer between 1 and n), which acts either as the representative delivery terminal, or as the proximate terminal with the value of the specified delivery 229 representing unicast, and additionally whose value of the state 223 represents being non-idle, in the order of the indicated priorities (Step S113).

If the client terminal device 10-*p* is the representative delivery terminal (Yes in Step S114), the terminal-to-terminal transfer unit 13-*p* references the terminal information 120-*p*. The terminal-to-terminal data transfer unit 13-*p* sequentially transfers the delivery data to a client terminal device 10-*q* (where q is at least one integer between 1 and n), whose value of the state 124-*p* represents being non-idle and whose value of the specified delivery 126-*p* represents non-unicast, in the order of the indicated priorities (Step S115).

The terminal-to-terminal data transfer unit 13-*p* references the terminal information 120-*p*. The terminal-to-terminal data transfer unit 13-*p* sequentially transfers the delivery data to a client terminal device 10-*r* (where r is at least one integer between 1 and n), whose value of the state 124-*p* represents being idle and whose value of the specified delivery 126-*p* represents non-unicast, in the order of the indicated priorities (Step S116). If the client terminal device 10-*p* is not the representative delivery terminal (i.e., the proximate terminal) (No in Step S114), the processing goes to Step S117.

Figure 2D:
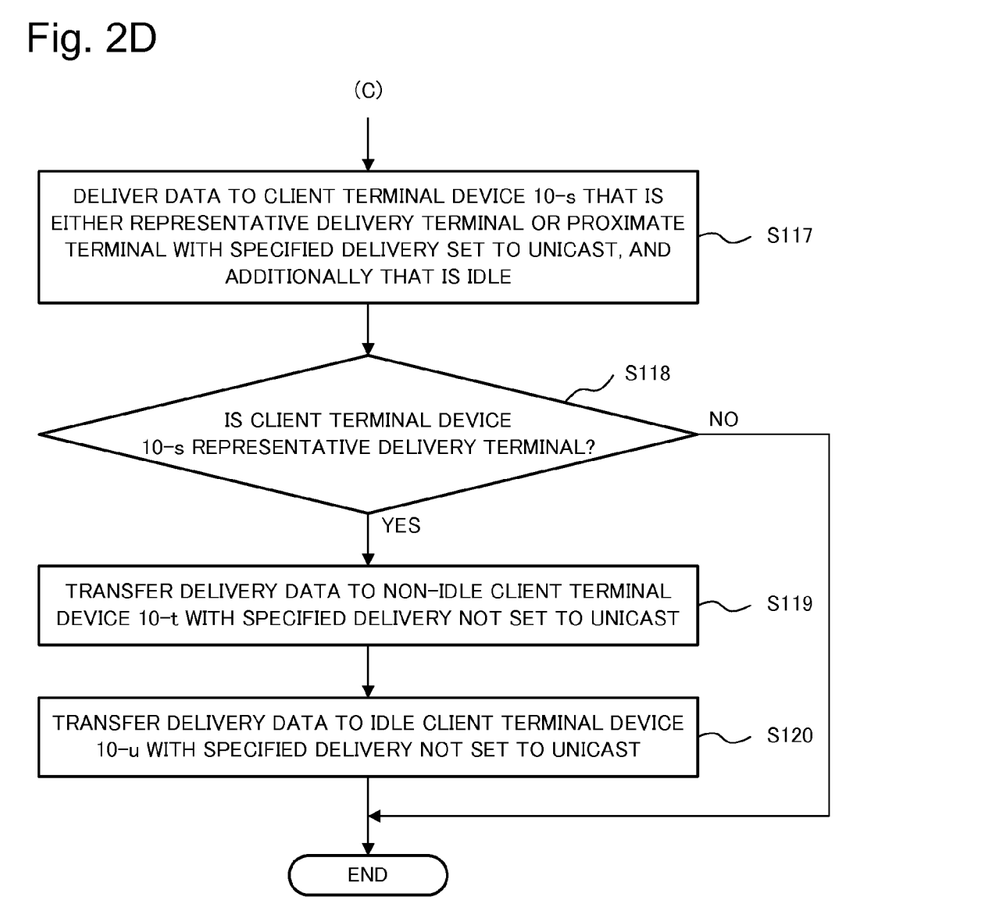
FIG. 2D is a flowchart (4/4) illustrating operations of the data delivery control system according to the first exemplary embodiment of the present invention.

The data delivery unit 21 references the terminal information 220. The data delivery unit 21 sequentially delivers the delivery data to a client terminal device 10-*s* (where s is at least one integer between 1 and n), which acts either as the representative delivery terminal, or as the proximate terminal with the value of the specified delivery 229 representing unicast, and additionally whose value of the state 223 represents being idle, in the order of the indicated priorities (Step S117).

If the client terminal device 10-*s* is the representative delivery terminal (Yes in Step S118), the terminal-to-terminal transfer unit 13-*s* references the terminal information 120-*s*. The terminal-to-terminal data transfer unit 13-*s* sequentially transfers the delivery data to a client terminal device 10-*t* (where t is at least one integer between 1 and n), whose value of the state 124-*s* represents being non-idle and whose value of the specified delivery 126-*s* represents non-unicast, in the order of the indicated priorities (Step S119).

The terminal-to-terminal data transfer unit 13-*s* references the terminal information 120-*s*. The terminal-to-terminal data transfer unit 13-*s* sequentially transfers the delivery data to a client terminal device 10-*u* (where u is at least one integer between 1 and n), whose value of the state 124-*s* represents being idle and whose value of the specified delivery 126-*s* represents non-unicast, in the order of the indicated priorities (Step S120), and then the whole process is finished. If the client terminal device 10-*s* is not the representative delivery terminal (i.e., the proximate terminal) (Yes in Step S118), the whole process is finished.

The data delivery control system 1 according to this exemplary embodiment allows for data delivery to a large number of client terminal devices without imposing a heavy load on the network by flexibly dealing with the network configuration. This is achieved because the client terminal device 10-1 and data delivery control device 20 operate as follows: the client terminal device 10-1 detects a proximate client terminal device 10-*i* to which the received delivery data can be transferred. The data delivery control device 20 delivers delivery data to the client terminal device 10-1, which then in turn transfers the delivery data to the client terminal device 10-*i*.

Broadcasting data from a server device to a large number of client devices, like Earthquake Early Warnings, poses a possibility of delays in data delivery caused by considerable loads imposed on resources of the server device (including a proxy server device) as well as on a network area surrounding the server device. Such loads imposed on the resources of the server device and on the network area surrounding the server device can be reduced if some client devices transfer the received delivery data to other client devices. However, if, for example, such some of the client devices transfer delivery data to other client devices that are not their proximate ones on a network, there is a possibility of increasing the load imposed on the whole network rather than decreasing the load.

In contrast, the data delivery control system 1 according to this exemplary embodiment allows the client terminal device 10-1 to detect, based on a predetermined criterion, a client terminal device 10-*i* to which the received delivery data can be transferred. The client terminal device 10-1 detects its proximate client terminal device on the network, that is a client terminal device 10-*i*, so as to reduce a load on the network caused during transfer of delivery data to the client terminal device 10-*i*. Then, based on the terminal information detected by each individual client terminal device, the data delivery control device 20 delivers delivery data to a client terminal device which acts as the representative delivery terminal. Each client terminal device acting as the representative delivery terminal transfers the delivery data to its proximate client terminal device(s). In this way, the data delivery control system 1 according to this exemplary embodiment makes it possible to reduce a load imposed around a server device during data delivery to a large number of client terminal devices as well as to avoid imposing a heavy load on a network by flexibly dealing with the network configuration.

In addition, the data delivery control system 1 according to this exemplary embodiment checks whether the client terminal devices 10-1 to **10-*n* are each in the idle state or not. The data delivery control system 1 then preferentially delivers delivery data to a client terminal device which is not in the idle state. Thus, the data delivery control system 1** according to this exemplary embodiment makes it possible to avoid a delay in data delivery to a user who is using the client terminal device.

Furthermore, the data delivery control system 1 according to this exemplary embodiment selects either a multicast or unicast mode to deliver data according to a value given by the delivery mode presentation unit 25. Thus, the data delivery control system 1 makes it possible to flexibly deliver data depending on whether priority is given to high-speed data delivery or to high reliability of data delivery.

Moreover, with regard to some client terminal devices in the case of unicast data delivery, the data delivery control system 1 allows the data delivery control device 20 to deliver data directly to a client terminal device registered as the proximate terminal, instead of transferring data from the representative delivery terminal to the proximate terminal. This enables the data delivery control system 1 to further improve the reliability of data delivery for such some client terminal devices.

Furthermore, in the case of unicast data delivery, the data delivery control system 1 according to this exemplary embodiment allows for sequential data delivery to client terminal devices 10-1 to **10-*n* in accordance with priorities given by the priority presentation unit 24. This enables the data delivery control system 1** to avoid a delay in data delivery to a higher priority client terminal device.

Second Exemplary Embodiment

Figure 6:
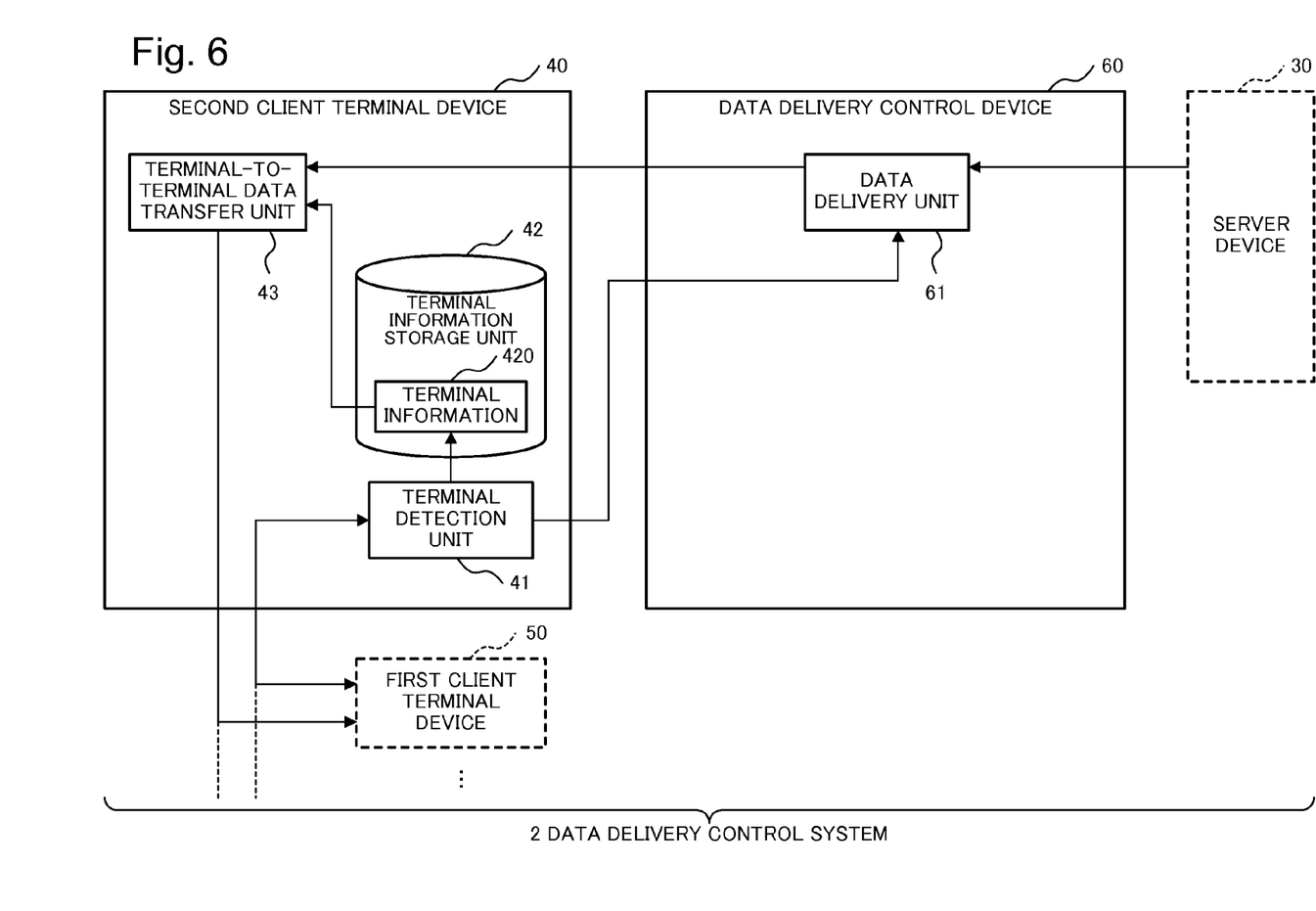
FIG. 6 is a block diagram illustrating a configuration of a data delivery control system according to a second exemplary embodiment of the present invention.

FIG. 6 is a conceptual block diagram illustrating a configuration of a data delivery control system 2 according to a second exemplary embodiment of the present invention.

The data delivery control system 2 of this exemplary embodiment includes a second client terminal device 40 and a data delivery control device 60. The data delivery control system 2 may include two or more second client terminal devices.

The second client terminal device 40 includes a terminal detection unit 41, a terminal information storage unit 42, and a terminal-to-terminal data transfer unit 43.

From among a plurality of client terminal devices available for communication via a network, the terminal detection unit 41 detects, based on a predetermined criterion, a first proximate client terminal device 50 to which delivery data received from a server device 30 can be transferred. Two or more first client terminal device 50 may be detected. The terminal detection unit 41 stores into the terminal information storage unit the terminal information 420 which includes a list of identifier(s) capable of identifying the detected first client terminal device(s) 50 while outputting the terminal information 420 to the data delivery control device 60.

The data delivery control device 60 includes a data delivery unit 61.

The data delivery unit 61 receives delivery data that has been sent from the server device 30 to be delivered to the first client terminal device 50 and the second client terminal device 40. Then, the data delivery unit 61 delivers such delivery data to the second client terminal device 40 by referencing the terminal information 420 that has been output from the terminal detection unit 41.

The data delivery control system 2 according to this exemplary embodiment allows for data delivery to a large number of client terminal devices without imposing a heavy load on the network by flexibly dealing with the network configuration. This is achieved because the second client terminal device 40 and data delivery control device 60 operate as follows: the second client terminal device 40 detects a proximate first client terminal device 50 to which the received delivery data can be transferred. The data delivery control device 60 delivers delivery data to the second client terminal device 40, which then in turn transfers the delivery data to the first client terminal device 50.

<Example of Hardware Configuration>

The respective units shown in FIGS. 1 and 6 according to the respective exemplary embodiments above can be implemented by dedicated hardware (HW) (electronic circuits). In addition, at least the following functions and units can be regarded as functional (processing) units of a software program (software modules): storage control functions in the terminal information storage units 12-1 and 42, the terminal detection units 11-1 and 41, the terminal-to-terminal data transfer units 13-1 and 43, and the data delivery units 21 and 61. It should be noted that the individual unit separations depicted in these figures illustrate a configuration for explanatory convenience only, and a variety of configurations can be envisaged for implementation. One example hardware environment applicable to such implementation is described below with reference to FIG. 7.

Figure 7:
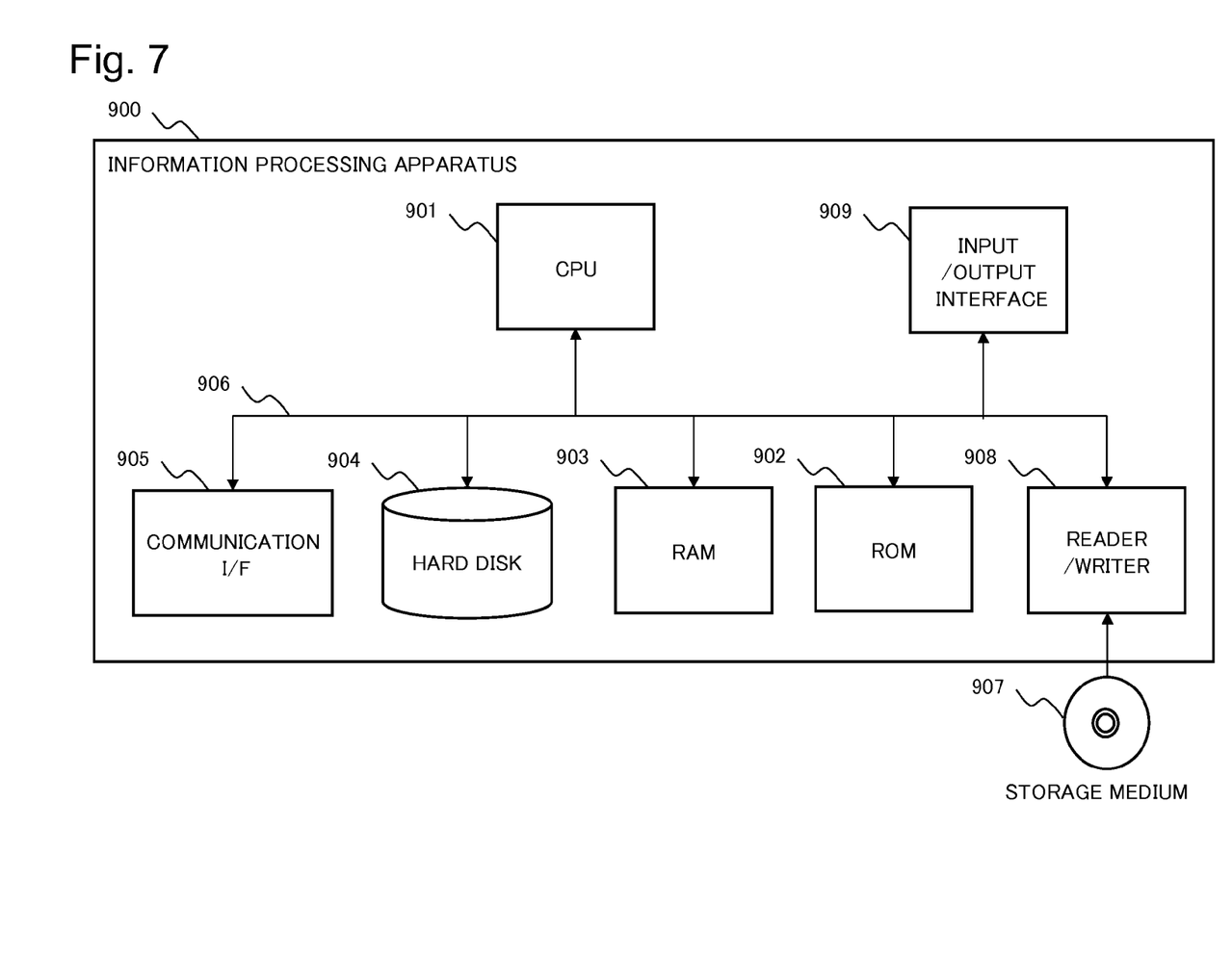
FIG. 7 is a block diagram illustrating a configuration of an information processing apparatus capable of implementing the client terminal devices and data delivery control devices according to the respective exemplary embodiments of the present invention.

FIG. 7 illustrates, by way of example, a configuration of an information processing apparatus 900 (computer) which can implement a client terminal device and a data delivery control device according to the exemplary embodiments of the present invention. In other words, FIG. 7 illustrates a configuration of a computer (information processing apparatus) capable of implementing the client terminal device and the data delivery control device illustrated in FIGS. 1 and 6, representing a hardware environment where the individual functions in the above-described exemplary embodiments can be implemented.

The information processing apparatus 900 illustrated in FIG. 7 includes the following as components:
CPU (Central_Processing_Unit) 901;
ROM (Read_Only_Memory) 902;
RAM (Random_Access_Memory) 903;
Hard disk (storage device) 904;
Communication interface 905 to an external device;
Reader/writer 908 capable of reading and writing data stored in a storage medium 907 such as CD-ROM (Compact_Disc_Read_Only_Memory); and
Input/output interface 909.

The information processing apparatus 900 is a general computer where these components are connected via a bus 906 (communication line).

The present invention explained with the above-described exemplary embodiments as examples provides the information processing apparatus 900 illustrated in FIG. 7 with a computer program which is capable of implementing the following functions: the storage control functions included in the terminal information storage units 12-1 and 42, as well as the terminal detection units 11-1 and 41, the terminal-to-terminal data transfer units 13-1 and 43, and the data delivery units 21 and 61, as illustrated in the block configuration diagrams (FIGS. 1 and 6) referred to in the respective description of the exemplary embodiments, and additionally the functions shown in the flowcharts (FIGS. 2A to 2D). Then, the computer program is read into the CPU 901 in the hardware, interpreted, and executed so as to accomplish the present invention. The computer program provided to the apparatus can be stored in a volatile readable and writable storage memory device (RAM 903) or in a nonvolatile storage device such as the hard disk 904.

In addition, in the case described above, currently general procedures can be used to provide a computer program into the hardware. These procedures include, for example, installing the computer program into the apparatus via any of various storage media 907 such as CD-ROM, or downloading it from an external source via communication lines such as the Internet. In such cases, the present invention can be seen as being formed of codes forming such computer program or being formed of the storage medium 907 storing the codes.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A client terminal device to which delivery data received from a server device can be transferred, and which is at least one client terminal device existing among the plurality of client terminal devices available for communication via a network comprising:
    at least one processor; and
    a memory storing instructions to be executed by the processor by causing the processor to execute:
        a terminal detection unit configured to detect, from among the plurality of client terminal devices, at least one logically proximate other client terminal device whose differential value of its address on the network is equal to or smaller than a threshold value and to store, into a storage unit, terminal information which includes a list of identifiers identifying the detected other client terminal devices while externally outputting the same terminal information, and
        a terminal-to-terminal data transfer unit configured to transfer the delivery data to the at least one logically proximate other client terminal device by referencing the terminal information upon receipt of the delivery data.

2. The client terminal device according to claim 1,
    wherein the terminal detection unit measures a speed of data transfer to/from the plurality of client terminal devices and detects the at least one first client terminal device whose measured speed of data transmission is equal to or greater than a threshold value.

3. The client terminal device according to claim 1,
    wherein the terminal detection unit detects whether the at least one first client terminal device is in an idle state or not, and the terminal detection unit stores into the terminal information storage unit the terminal information which includes information indicating whether the at least one first client terminal device is in the idle state or not, and
    the terminal-to-terminal data transfer unit, after transferring the delivery data to the at least one first client device which is not in the idle state, transfers the delivery data to the at least one first client device which is in the idle state.

4. A data delivery control system comprising:
    at least one second client terminal device existing among the plurality of client terminal devices; and
    a data delivery control device;
    wherein the at least one second client terminal device includes:
    at least one processor; and
    a memory storing instructions to be executed by the processor by causing the processor to execute:
        a terminal detection unit configured to detect, from among the plurality of client terminal devices available for communication via a network, at least one logically proximate first client terminal device, to which delivery data received from a server device can be transferred, whose differential value of its address on the network is equal to or smaller than a threshold value, and to store, into a storage unit, terminal information which includes a list of identifiers identifying the detected first client terminal devices while externally outputting the same terminal information, and
        a terminal-to-terminal data transfer unit configured to transfer the delivery data to the at least one logically proximate first client terminal device by referencing the terminal information upon receipt of the delivery data, and
    wherein the data delivery control device includes:
    at least one processor; and
    a memory storing instructions to be executed by the processor by causing the processor to execute:
        a data delivery unit configured to deliver, upon receipt of the delivery data from the server device to be delivered to the at least one first and second client terminal devices, the delivery data to the at least one second client terminal device by referencing the terminal information that has been output from the terminal detection unit.

5. The data delivery control system according to claim 4,
    wherein the data delivery control device further executes an idle state detection unit configured to detect whether the at least one second client terminal device is in the idle state or not,
    wherein the data delivery unit, after delivering the delivery data to the at least one second client device which is not in the idle state, delivers the delivery data to the at least one second client device which is in the idle state.

6. The data delivery control system according to claim 4,
    wherein the data delivery control device further executes a delivery mode presentation unit configured to present a high-reliability mode indicating that the delivery data should be delivered to the at least one first and second client terminal devices with high reliability of data delivery,
    wherein the data delivery unit adds a value given by the delivery mode presentation unit to the delivery data, then, if the delivery mode presentation unit indicates the high-reliability mode, the data delivery unit delivers the delivery data to at least one third client device selected from the at least one first client device based on a predetermined criterion as well as to the at least one second client terminal device, and
    if the delivery mode presentation unit gives a value indicating the high-reliability mode, the terminal-toterminal data transfer unit transfers the delivery data to the at least one first client device except the at least one third client device.

7. The data delivery control system according to claim 6, wherein the data delivery control device further executes:
a priority presentation unit configured to present values indicating priorities of the at least one first and second client terminal devices,
wherein if the delivery mode presentation unit indicates the high-reliability mode, the data delivery unit delivers the delivery data to the at least one third client device and the at least one second client terminal device in the order of the priorities from highest to lowest, and
if the delivery mode presentation unit indicates the high-reliability mode, the terminal-to-terminal data transfer unit transfers the delivery data to the at least one first client device except the at least one third client device in the order of the priorities from highest to lowest.

8. The data delivery control system according to claim 4, further comprising the at least one first client terminal device.

9. A data delivery control method comprising:
by at least one second client terminal device among a plurality of client terminal devices,
detecting, from among the plurality of client terminal devices available for communication via a network, at least one logically proximate first client terminal device, to which delivery data received from a server device can be transferred, whose differential value of its address on the network is equal to or smaller than a threshold value, and storing, into a storage unit, terminal information which includes a list of identifiers identifying the detected first client terminal devices while externally outputting the same terminal information;
by a data delivery control device,
delivering, upon receipt of the delivery data from the server device to be delivered to the at least one first and second client terminal devices, the delivery data to the at least one second client terminal device by referencing the terminal information;
by the at least one second client terminal device,
transferring the delivery data to the at least one first client terminal device by referencing the terminal information upon receipt of the delivery data.

10. A non-transitory computer-readable medium storing a computer program:
causing at least one client terminal device to which delivery data received from a server device can be transferred, and which is existing among a plurality of client terminal devices available for communication via a network to realize,
a terminal detection function that detects, from among the plurality of client terminal devices, at least one logically proximate other client terminal device whose differential value of its address on the network is equal to or smaller than a threshold value and stores, into a storage unit, terminal information which includes a list of identifiers identifying the detected other client terminal devices while externally outputting the same terminal information, and
a terminal-to-terminal data transfer function that transfers the delivery data to the at least one logically proximate client terminal device by referencing the terminal information upon receipt of the delivery data.

* * * * *